United States Patent [19]
Connors et al.

[11] Patent Number: 6,122,099
[45] Date of Patent: Sep. 19, 2000

[54] OPTICAL DEVICE HAVING IMPROVED FOCUS LOCKING ASSEMBLY AND METHOD OF MAKING

[75] Inventors: Clifford James Connors, Tempe; Gary A. Wannagot, Mesa; Timothy Roe Goebel, Tempe, all of Ariz.

[73] Assignee: Litton Systems, Inc., Woodland Hills, Calif.

[21] Appl. No.: 09/252,740

[22] Filed: Feb. 19, 1999

[51] Int. Cl.[7] .............................. G02B 23/10; G02B 7/02
[52] U.S. Cl. .................... 359/400; 359/350; 359/425; 359/427; 359/825; 359/829
[58] Field of Search .................................... 359/400, 350, 359/425, 427, 825, 823, 822, 829, 828

[56] References Cited

FOREIGN PATENT DOCUMENTS 484835  7/1952  Canada ................................ 359/829

Primary Examiner—Jon Henry
Attorney, Agent, or Firm—Marsteller & Associates, P.C.

[57] ABSTRACT

A method of achieving a focusing adjustment of an optical assembly, and of releasably locking this focusing adjustment, is described. A night vision weapon sight (10) which implements this method includes an objective lens assembly (14), an eyepiece lens (18), and an image intensifier tube (20) receiving light via the objective lens in order to provide an image via the eyepiece lens. The objective lens assembly includes a base portion (32) into which a lens housing (34) is threadably received. The threaded engagement of the base portion and lens housing is locked by a collet-like array of radially flexible fingers (42) each having a conical outer surface. A locking collar (44) having a conically tapering inner surface threadably engages the lens housing (34) and engages the collet fingers (42). Locking of the locking collar (44) is ensured by threaded engagement of a locking ring (54) with the locking collar (44) such that the prevailing torque tightens both of a pair of threaded engagements of opposite hand.

12 Claims, 3 Drawing Sheets

Fig. 5

1) INSTALL LOCKING RING 54 ON BASE 32;

2) CAPTURE LOCKING RING 54 ON BASE 32 WITH RETAINING RING 58 IN GROOVE 60;

3) THREAD LENS ASSEMBLY 30 INTO BASE 32;

4) ADJUST FOCUS BY THREABLY ADJUSTING LENS ASSEMBLY 30 RELATIVE TO BASE 32;

5) SLIDE LOCKING COLLAR 44 OVER FINGERS 42 OF BASE 32, AND ENGAGE THREAD 44a ONTO THREAD 36 OF LENS ASSEMBLY 30;

6) HOLD LENS ASSEMBLY 30 NON-ROTATIONAL, AND SNUG LOCKING COLLAR 44 ON THREAD 36;

7) ENGAGE L/H THREAD 50a WITH L/H THREAD 52a;

8) UTILIZE STEP 7 TO ENGAGE CONICAL SURFACE 48 WITH SURFACE 42a OF FINGERS 42, AND TO FORCEFULLY ENGAGE FINGER PORTIONS OF THREAD 38 WITH THREAD 36;

9) FORCEFULLY TIGHTEN LOCKING RING 54 ON LOCKING COLLAR 44, FURTHER TIGHTENING COLLAR 44.

OPTICAL DEVICE HAVING IMPROVED FOCUS LOCKING ASSEMBLY AND METHOD OF MAKING

BACKGROUND OF THE INVENTION

1. Field of the Invention

The present invention is in the field of optical devices, particularly an optical assembly for a night vision device. More particularly, the present invention relates to a night vision weapon sight having an image intensifier tube. The night vision weapon sight is usable in day light as well as at night. Still more particularly, the present invention relates to such a night vision weapon sight having an improved focus locking assembly for an objective lens of the sight. Also, the present invention relates to a method of making such a night vision weapon sight.

2. Related Technology

A conventional night vision weapon sight is known in accord with U.S. Pat. No. 4,417,814, issued Nov. 29, 1983 to Darrel Doliber. The weapon sight taught by the Doliber patent is believed to include an objective lens or lens assembly admitting light to an image intensifier tube. The image intensifier tube provides a visible image, which at a combiner mirror is combined with light from a reticle injector. The image from the image intensifier tube, and the light from the reticle injector are presented together to a user of the Doliber device via an eyepiece lens. The reticle light is focused to be superimposed on the image from the image intensifier tube, so as to provide a reticle point or aiming point. The Doliber patent is believed to not provide any information about how the objective lens or lens assembly of the sight is focused.

Other conventional weapon sights are known in accord with U.S. Pat. Nos. 5,272,514, issued Dec. 21, 1993 to Amotz Dor; and 5,497,266, issued May 5, 1996 to Larry D. Owen. Each of these patents is believe to teach at least one embodiment of the sight disclosed in which the sight includes an image intensifier tube. However, neither of these patents is believed to disclose an objective focus locking assembly for the sight.

SUMMARY OF THE INVENTION

In view of the above, a need is believed to exist for an objective lens assembly which overcomes or decreases the severity of one or more of the deficiencies of the related technology.

Further, a need is believed to exist in the pertinent technology for a night vision weapon sight with an objective lens assembly that includes a focusing and focus retention apparatus overcoming or decreasing the severity of the shortcomings of such objective lens assemblies provided by the conventional technology.

Additionally, a need exists for methods of making such an objective lens assembly, and such a night vision weapon sight.

Accordingly the present invention provides according to a particularly preferred exemplary embodiment of the invention, an optical device having an optical axis and a focus adjusting and locking assembly for positioning a lens along the optical axis, the device comprising: a lens; a lens housing carrying the lens for axial movement along the optical axis; a base portion retaining the lens housing and lens in a selected axial position along the optical axis; the base portion and lens housing cooperatively defining a threaded engagement of a first selected hand direction such that relative rotation causes axial displacement of the lens along the optical axis, the lens housing and base portion further defining a collet structure at least in part axially coextensive with the threaded engagement of the lens housing and base portion, the collet structure including a plurality of axially extending radially yieldable fingers carried by one of the base portion and lens housing, with each of the plurality of fingers inwardly defining a part of the threaded engagement between the lens housing and base portion, each of the plurality of fingers outwardly defining a wedged surface extending axially; the lens housing also defining a thread portion threadably engaging with the plurality of fingers; and a locking collar threadably engaging with the lens housing at the thread portion and having a radially inwardly disposed conical surface engaging with the wedged surface of the plurality of fingers.

In use of this device, tightening of the locking collar on the threaded portion of the lens housing radially deflects the plurality of fingers to lock the threaded engagement and to rotationally and axially immobilize the lens housing relative to the base portion.

Further, the present invention provides a method including steps of adjusting the focus of an optical assembly by rotating one part relative to another at a threaded interconnection, holding one of the parts non-rotational relative to the other part, tightening a locking collar having a first threaded connection to one of the parts, engaging with the locking collar a locking ring having a threaded connection of a hand opposite to that of the threaded connection of the two parts and locking ring with one another, and tightening the locking ring to simultaneously transfer torque to the locking collar.

In view of the above, it will be apparent that an advantage of the present invention resides in the provision of a optical device or night vision weapon sight with an objective lens assembly that is easily focused during manufacturing of the optical device or night vision weapon sight, which securely retains this focus established during manufacturing through severe environments, extremes of heating and cooling cycles, and rough handling; and which nevertheless also allows the optical assembly to be serviced and re-focused during its service life. Moreover, the components of the optical assembly are not damaged by locking the focus adjustment, so that when service of the device is required the focus lock of the optical assembly can be unlocked and refocused with the same degree of precision applying during original manufacture of the device. In other words, and in contrast to optical assemblies that use cone point set screws, adhesives, and/or such other damaging expedients to perform a locking function, there is no damage to any component of the present optical assembly due to locking of a focus position.

These and additional objects and advantages of the present invention will be apparent from a reading of the present detailed description of a single particularly preferred exemplary embodiment of the present invention, taken in conjunction with the appended drawing Figures, in which the same reference numeral refers to the same feature, or to features which are analogous in structure or function to one another.

DESCRIPTION OF THE DRAWING FIGURES

FIG. 1 provides a side elevation view of a night vision weapon sight embodying the present invention.

FIG. 2 is an optical schematic representation of the night vision weapon sight seen in FIG. 1;

FIG. 3 provides an enlarged side elevation view of an objective lens assembly of the night vision weapon sight seen in FIGS. 1 and 2, and is presented partially in cross section;

FIG. 4 is an exploded perspective view of a number of cooperative components of the objective lens assembly seen in FIG. 3 for the night vision weapon sight seen in FIGS. 1–3; and FIG. 5 diagrammatically presents a process flow chart illustrating steps in a method of locking an optical lens assembly utilizing the present invention.

DETAILED DESCRIPTION OF A PREFERRED EXEMPLARY EMBODIMENT OF THE INVENTION

Figure 1:
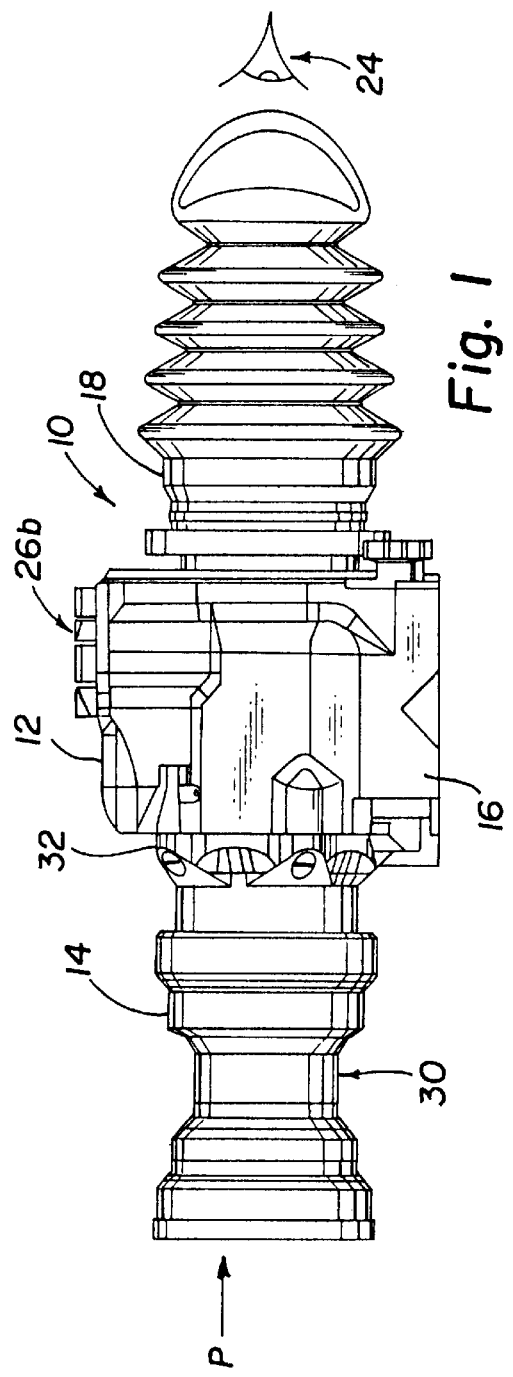
Figure 2:
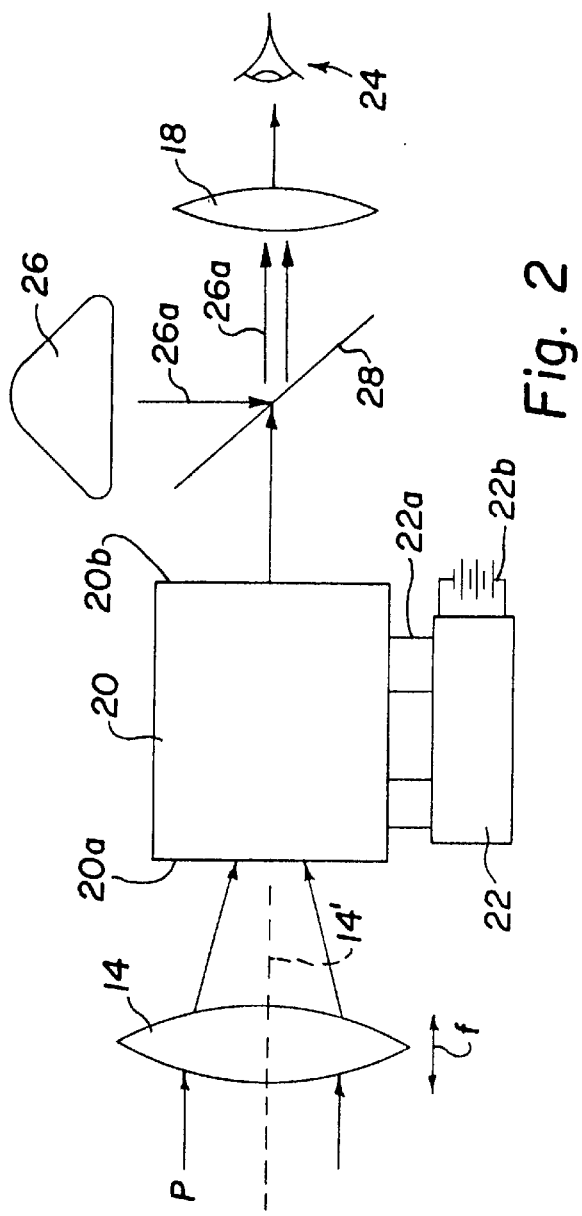

Referring first to FIGS. 1 and 2, there is shown in FIG. 1 a side elevation view of a night vision weapon sight 10. This sight 10 has a body 12 including generally, an objective lens assembly 14 having an optical axis indicated at 14' of FIG. 2, a central body section 16, and an eyepiece lens assembly 18. More particularly, the objective lens assembly 14 (which is to be further described below) includes a front objective lens element 14a (represented schematically in FIG. 2 and seen in FIG. 3) which receives light photons "p" from a scene to be viewed. This light is focused by the lens assembly 14 through the front light-receiving surface 20a of an image intensifier tube 20. The tube 20 receives electrical power from a power supply circuit 22 via electrical conductors 22a. In order to provide electrical power in the device 10, which is preferably man-portable, the power supply 22 receives power from a battery 22b, which is housed in the central body section 16. The present invention is not limited, however, to man portable devices, as those ordinarily skilled in the pertinent arts will appreciate from a reading of the follow further detailed description of the device 10.

In response to the receipt of focused light "p" at light input surface 20a, and the electrical power from power supply circuit 22, the image intensifier tube 20 provides at an image output surface 20b an intensified image in visible phosphorescent light replicating the scene from which photons "p" originated. As is seen best in FIG. 2, the light from surface 20b is presented by eyepiece lens 18 (schematically depicted in FIG. 2) to the eye 24 of a user of the device 10. Thus, the user 24 sees an image by peering into eyepiece lens 18 which replicates the scene to be viewed, even though this scene may be illuminated only by visible light that is too dim to provide a view with natural human vision, or may be illuminated by star light which is rich in infrared light, although this infrared light is invisible to natural human vision.

In order to allow the device 10 to be used to sight a weapon, a reticle projector 26 is provided. For example, the reticle projector 26 may be of the design taught by the Doliber patent cited above, although the invention is not so limited. As is depicted in FIG. 2, a reticle image 26 is provided, reflected from a combiner mirror, and is optically transmitted to the user's eye. This reticle image is adjustably positional relative to the device 10 by the operator of the device 10 by use of windage and elevation adjusting screws (generally indicated by arrowed numeral 26b of FIG. 1). The user of device 10 thus sees a replica image of the scene from which the photons "p" originated, plus a dot or other reticle patter from reticle injector 26. The reticle image is generally of a contrasting color to the image provided by image intensifier tube 20, and is focused so as to appear to be coincident with the scene viewed through the device 10.

Figure 3:
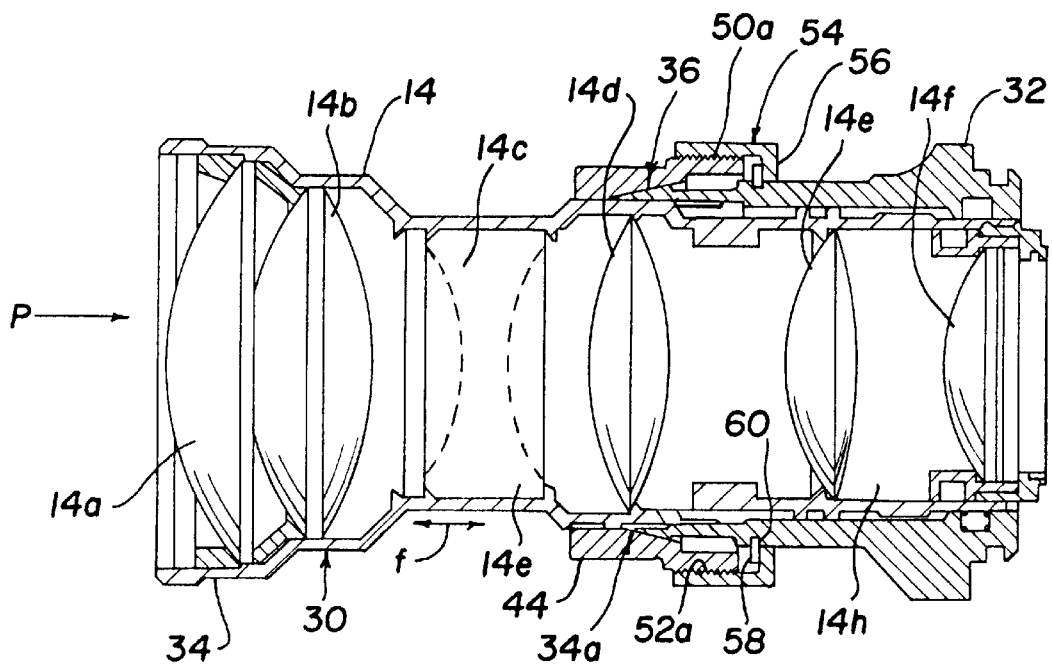
Figure 4:
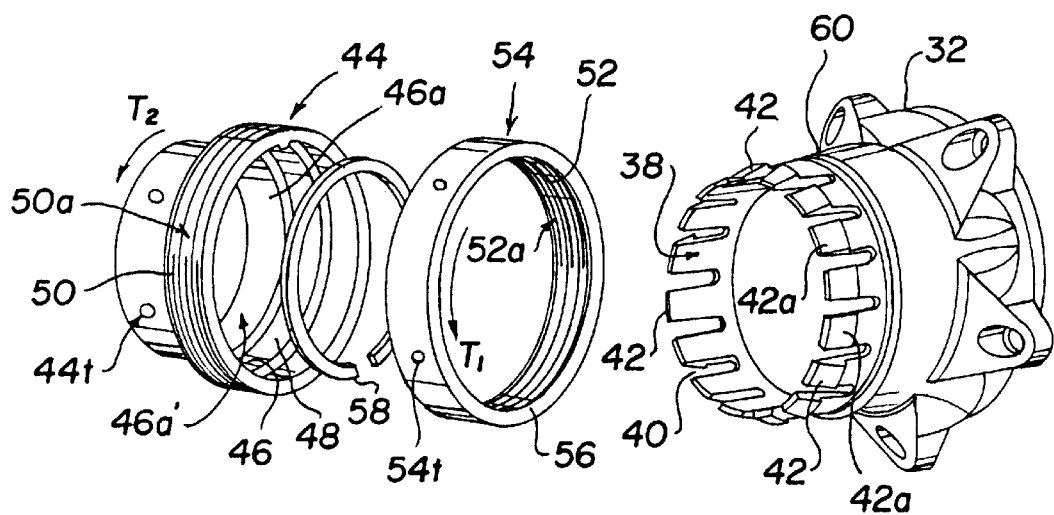

Considering now FIGS. 3 and 4 in conjunction with one another, it is seen that the objective lens assembly 14 includes not only the first objective lens 14a, but additional lenses 14b through 14f (considered sequentially through the device 12 from lens 14a toward the viewer 24t). It will be understood that the arrangement and combination of lenses 14a–14f of the lens assembly 14 seen in FIG. 3 is exemplary only, and is in no way limiting of the present invention. Considering the objective lens assembly 14 in greater detail now, it is seen that this assembly includes a lens assembly, generally indicated with the reference numeral 30, and a base portion 32 which is secured to the central housing portion 16 and carries the lens assembly 30. Carried partly within the base portion 32, and extending forwardly of this base portion and of the housing portion 16 is a tubular lens housing 34, which is part of the lens assembly 30. The tubular lens housing 34 is stepped in diameter on its outer surface, both to internally accommodate the diameters of the lenses 14a–14f, and to provide for an adjustable and lockable interface of the lens housing 34 with the base member 32, as will be further explained. Thus, the axial position of this lens housing 34 relative to the surface 20a of the image intensifier tube 20 determines whether the light photons "p" are properly focused as they are received by the image intensifier tube 20, viewing the arrow "f" of FIG. 2.

In order to provide for axial adjustment of the lens housing 34 (and of the lenses 14a–14f) relative to the image intensifier tube 20 (diagrammatically indicated by the double headed arrow "f" on FIG. 2), the housing 34 includes a cylindrical body section indicated by arrowed numeral 34a. Outwardly, this cylindrical body section 34a of lens housing 34 defines a fine-pitch right-handed thread section, indicated by arrowed numeral 36, at the location of this body section indicated by this arrow. Similarly, the base portion 32 inwardly defines a matching fine-pitch right-handed thread section, indicated with arrowed numeral 38, best seen in FIG. 4. As is seen in FIG. 3, the lens assembly 30 is threadably carried in the base portion 32 by engagement of the thread sections 36 and 38.

Further, as is seen particularly in FIG. 4, the base portion 32 also defines a plurality of circumferentially spaced apart and axially extending slots 40, which extend axially a substantial portion of the axial dimension of the thread section 38. Consequently, because of these slots 40, the base portion 32 defines a plurality of axially extending circumferentially spaced apart finger portions 42. The thread section 36 of lens housing 34 and thread section 38 of base member 32 threadably engage one another so that by rotation of the tubular lens housing 34, the axial position of the lenses 14a through 14f can be manually adjusted relative to the image intensifier tube 20 during manufacturing of the night vision weapon sight 10.

The focus adjustment of lens housing 34 relative to the image intensifier tube 20 which is achieved by relative rotation of the lens housing 34 is retained by clamping the plurality of finger portions immovably into engagement with the section 34a of lens housing 34. This clamping is provided according to the preferred embodiment of the present invention by radially providing each of the finger portions 42 with a tapering surface section, indicated with the numeral 42a. It is seen in FIG. 4 that the tapering surface sections 42a in conjunction with one another outwardly define a conical taper on the base member 32, which conical taper increases in diameter axially toward the central body section 16. Carried on the base portion 32 and partially overlapping axially with the tubular lens housing 34 forwardly of this base portion is a locking collar member 44.

This collar member 44 inwardly defines a stepped through bore 46, having a straight cylindrical bore portion 46a which defines a fine-pitch right handed thread (indicated with arrowed numeral 46a') threadably engaging tubular lens housing 34 at thread section 34a having thread 36.

Further, this collar member 44 includes a conical internal surface portion 48, best seen in FIG. 4, which matches the taper of surface portions 42a of the fingers 42, and which engages with each one of the multitude of fingers 42 at these tapering conical external surfaces 42a. Collar member 44 also includes a straight cylindrical outwardly disposed surface 50 at which this collar member defines a fine-dimension left-handed thread 50a.

The thread 50a is threadably engaged by a matching fine-dimension left-handed thread section 52a defined on a straight cylindrical internal surface 52 of a locking ring 54. This locking ring 54 includes a radially inwardly extending flange part 56 which is engaged by a retaining ring 58. The retaining ring 58 is received into a groove 60 defined by the base portion 32, so that the locking ring 54 is captively received rotationally on this base portion. The collar 44 and ring 54 each define respective pin-spanner apertures for torque transmission, respectively indicated with the arrowed numerals 44t and 54t. These torque transmission apertures 44t and 54t are provided so that the collar and ring may be grasped by pin-spanner type tightening tools (not seen in the drawing Figures) during manufacturing or adjustment of the night vision weapon sight 10. That is, in order to relatively tighten or loosen these two elements, and to respectively lock and unlock the focus adjustment of lens housing 34 relative to base portion 32, the collar 44 and ring 54 may have a level of torque applied to them which exceeds what a person can apply by hand.

In view of the above, it will be appreciated that during manufacturing of the night vision weapon sight 10, the lenses 14a–14f of the objective lens group are adjusted in lens housing 34 relative to one another. Accordingly, attention now is directed to the process flow chart of FIG. 5 as an adjunct to the following description. First of all, with the base member 32 attached to the central body 16, the locking ring 54 is installed onto the base portion 32, and is captively retained there by installation of retaining ring 58 into groove 60. The locking collar 44 is threaded over and preferably beyond the threads 36 of lens assembly 30. The lens assembly 30 is then threaded into the base portion 32. Then, the housing 34 is adjusted axially relatively to base member 32 in order to focus light transmitted through the lens group 14 through the light receiving surface 20a of the image intensifier tube 20, recalling schematic arrow "f" of FIG. 2.

During the axial focusing adjustment of the lens housing 34, this lens housing 34 may be simply rotated by hand relative to the base member 32 until the desired axial position for the housing 34 and precision of focus for the lenses 14 is obtained. Then the lens housing 34 is held against rotation relative to the base portion 32, and the locking collar 44 is moderately tightened on thread 36 of housing thread section 34a by right-handed rotation and relative movement axially toward the base portion 32. As a result, the internal conical surface 48 of the collar 44 engages the external conical surfaces 42a of the plurality of fingers 42 on base member 32. Thus, these fingers 42 are forced radially inwardly, locking thread section 38 into engagement with thread 36 on thread section 34a of the lens housing 34. Because of this engagement of one fine-pitch thread with another, hand-tightening of locking collar 44 is sufficient at this time of the process to hold the rotational position of lens housing 34 relative to base portion 32, thus retaining the selected axial position of focus adjustment. It will be understood that the invention is not limited to hand-tightening at this stage of the process.

Finally, in order to lock the focus adjustment against accidental disruption, and against all of: extreme conditions of use of the device 10, including severe handling and weather conditions, heating and cooling cycles, rough handling, and the various bumps and bangs that such a device may be subject to during its service life, the locking ring 54 is now threadably engaged (recalling that this is a left-handed thread engagement) with the locking collar 44. Tightening of locking ring 54 with locking collar 44 is accomplished by left-handed threading engagement and subsequent tightening of these two locking members. Torque transmission to the collar 44 and ring 54 are then effected, preferably by use of a pin spanner engaging apertures 54t.

The applicant believes that simply applying a tightening torque to ring 54 may be sufficient to lock the lens assembly 14 while simply allowing this torque to be reacted through the central body section 16 of the device 12, because as can be seen viewing FIG. 4, a torque T1 applied to ring 54 is largely transferred across the threads 52a and 50a to also effect tightening of the locking collar 44.

Moreover, during this tightening of the collar 44 and ring 54, and although there undoubtedly is some decrease of the torque applied to ring 54 as this torque is realized at collar 44 (i.e., because of frictional engagement of the flange 56 with ring 58), still a large fraction of the applied torque on locking ring 54 is realized also at locking collar 44. Considering the effect on locking collar 44 of this transferred torque, it is seen in FIG. 4 by arrow T2 that this torque tends to simultaneously tighten the locking collar 44 on the lens housing 34 so that the surfaces 42a (i.e., on fingers 42) and 48 (i.e., on locking collar 44) ever more tightly engage one another. The shallow tapered surfaces 42a and 48 provide mechanical advantage to produce a considerable radial force between the fingers 42 and the thread 36 at housing thread section 34a with only a modest torque on the ring 54.

The torque relationship of the thread 44a on lens housing thread section 34a versus that of thread section 42a of locking collar 44 on this same lens housing thread section is such that the effect of the radially tightening wedged fingers 42 (i.e., having tapering surfaces 42a) much more tenaciously and progressively grips the lens housing 34 and holds it against relative rotation in base portion 32; as compared to the frictional torque transmission across the thread section 44a to the lens housing 34 (and tending to relatively rotate this lens housing in base portion 32). Consequently, there is no tendency for the lens housing 34 to rotate relatively to base portion 32 even when torque is applied only to locking ring 54. The tightening of locking ring 54 does not, therefore, disrupt the focus adjustment obtained earlier in the process.

Still further, the effect of this applied tightening torque (even when applied to only locking ring 54) is to simultaneously lock the collar 44 on housing 34 and base member 32, while also locking the locking ring 54 on locking collar 44. The level of torque applied in this way is above the level of torque that a person can manually apply while grasping the device 10 in the hands. Thus, not only is the selected focus adjustment retained, it is effectively locked against unauthorized adjustment.

On the other hand, it is seen in view of the above that none of the component parts of the assembly 14 are damaged by the locking operations described above. As a result, the above described focus adjustment and locking of the objective lens assembly 14 can be loosened if necessary during subsequent (i.e., on a service bench) service and adjustment of the device 10. The threads of the lens assembly 30, and of the locking collar 44 and locking ring 54, will be essentially undamaged by their previous locking, so no precision of adjustment is lost for future service and focus locking operations. Accordingly, should a new focus procedure for the objective lens assembly 30 be desired, this can be carried out as described above after the assembly has been unlocked by the reversal of the locking process explained above. This aspect of the invention allows the device 10 to be fitted with a new image intensifier tube 20 if such is needed during the service life of the device 10. After the new image intensifier tube 20 is installed into the device 10, the lens assembly 30 is unlocked, the factory focus procedure is repeated as described above, and the new image intensifier tube will deliver a sharply focused image to the user 24.

Because the surfaces of the threaded engagements described above are substantially not damaged by the focus locking procedure (especially, no common cone-point locking set screws are used on these fine thread surfaces), when a re-focusing of the device 10 is desired, the threaded surfaces remain in good condition and allow a precise focus adjustment of the device. On the other hand, focus of the device 10 is not at all at risk of becoming loose or of being lost in the field because of handling of the device 10. Without torque transmission tools (i.e., the pin spanners used in manufacturing and service of the lens assembly 30) which are necessary to unlock the collar 44 and ring 54 from one another and from lens housing 34, the focus of the device 10 cannot be changed "in the field." In other words, experience has shown that even a large man with strong hands cannot apply enough torque manually to the lens assembly 30 to unlock or change the focus set by the above procedure.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is certainly not exhaustive of the scope of the invention. Consequently, the invention is intended to be limited only by the spirit and scope of the appended claims, giving full cognizance to equivalents in all respects.

We claim:

1. An optical device having an optical axis and a focus adjusting and locking assembly for positioning a lens along said optical axis, said device comprising:
    a lens;
    a lens housing carrying said lens for axial movement along said optical axis;
    a base portion retaining said lens housing and lens in a selected axial position along said optical axis;
    said base portion and lens housing cooperatively defining a threaded engagement of a first selected hand direction such that relative rotation causes axial displacement of said lens along said optical axis; said lens housing and base portion further defining a collet structure at least in part axially coextensive with said threaded engagement of said lens housing and base portion, said collet structure including a plurality of axially extending radially yieldable fingers carried by one of said base portion and lens housing, with each of said plurality of fingers inwardly defining a port of said threaded engagement between said lens housing and base portion, each of said plurality of fingers outwardly defining a wedged surface extending axially; said lens housing also defining a thread portion threadably engaging with said plurality of fingers;
    a locking collar threadably engaging with said lens housing at said thread portion and having a radially inwardly disposed conical surface engaging with said wedged surface of said plurality of fingers;
    whereby, tightening of said locking collar on said thread portion of said lens housing radially deflects said plurality of fingers to lock said threaded engagement to rotationally and axially immobilize said lens housing relatively to said base portion.

2. The optical device of claim 1 wherein said assembly further includes said locking collar outwardly defining a thread section of a second hand opposite to said selected first hand, and a locking ring threadably engaging with said locking collar at said thread section of said second hand.

3. The optical device of claim 1 wherein said base member carries a retaining ring member captively retaining said locking ring.

4. The optical device of claim 2 wherein said locking ring includes means for a torquing tool to engage therewith, such that a level of torque exceeding manually applicable torque is applied to said locking ring.

5. The optical device of claim 4 wherein said locking collar also includes means for a torquing tool to engage therewith, such that a level of torque exceeding manually applicable torque is applied to said locking ring and collar to tighten threads of opposite hands.

6. A night vision device having an objective lens receiving light from a scene and delivering this light focused to an image intensifier tube, a body portion of the device receiving said image intensifier tube and said tube in response to receipt of said focused light providing a replica image in visible light, and an eyepiece lens projecting said replica image to an user of said device, said objective lens of said device having an optical axis; and a focus adjusting and locking assembly for positioning said objective lens along said optical axis, said focus adjusting and locking assembly comprising:
    a lens housing carrying said objective lens for axial movement along said optical axis;
    a base portion securing to said housing portion and retaining said lens housing and lens in a selected axial position along said optical axis;
    said base portion and lens housing cooperatively defining a threaded engagement of a first selected hand direction such that relative rotation of said lens housing causes axial displacement of said lens along said optical axis; said lens housing and base portion further defining a collet structure at least in part axially coextensive with said threaded engagement of said lens housing and base portion, said collet structure including a plurality of axially extending radially yieldable fingers carried by said base portion, and each of said plurality of fingers inwardly defining a part of said threaded engagement between said lens housing and base portion, each of said plurality of fingers outwardly defining a wedged surface extending axially; said threaded engagement of said lens housing and base portion also including said lens housing defining a thread portion threadably engaging with said plurality of fingers;

a locking collar threadably engaging with said lens housing at said thread portion and having a radially inwardly disposed conical surface engaging with said wedged surface of said plurality of fingers; said locking collar outwardly defining a thread section of a second hand opposite to said selected first hand;

a locking ring threadably engaging with said locking collar at said thread section of said second hand;

whereby, tightening of said locking collar on said thread portion of said lens housing radially deflects said plurality of fingers to lock said threaded engagement and rotationally and axially immobilize said lens housing relatively to said base portion, and tightening of said locking ring on said locking collar simultaneously tightens said locking collar relative to said base portion while tightening said locking ring relative to said locking collar.

7. The night vision device of claim 6 wherein said base member carries a retaining ring member captively retaining said locking ring rotationally thereon.

8. The night vision device of claim 6 further including a combiner mirror transmitting said replica image to a user of said device, and a reticle injector providing a beam of light reflecting from said combining mirror to also provide an aiming reference for said user, the position of which relative to said replica image can be selectively adjusted by said user, whereby said night vision device may be employed as a weapon sight.

9. The optical device of claim 6 wherein each of said locking collar and said locking ring also includes respective means for engagement by a respective torquing tool, such that a level of torque exceeding manually applicable torque may be applied to said locking collar and locking ring in opposite-handed directions.

10. A night vision weapon sight, said weapon sight having an objective lens receiving light from a scene and delivering this light focused to an image intensifier tube, a body portion of the device receiving said image intensifier tube and said tube in response to receipt of said focused light providing a replica image in visible light, a combiner mirror passing said replica image toward a user of said sight, and an eyepiece lens projecting said replica image to an user of said device, a reticle injector providing a light beam reflecting from said combiner mirror and to said user to serve as an aiming reference for the user of the sight, said objective lens having an optical axis; and a focus adjusting and locking assembly for positioning said objective lens along said optical axis, said focus adjusting and locking assembly comprising:

a lens housing extending forwardly of said sight body portion and carrying said objective lens for axial movement along said optical axis;

a base portion securing to said body portion and retaining said lens housing and lens in a selected axial position along said optical axis;

said base portion and lens housing cooperatively defining a threaded engagement of a first selected hand direction such that relative rotation of said lens housing causes axial displacement of said lens and lens housing along said optical axis and relative to said body portion and image intensifier tube; said lens housing and base portion further defining a collet structure at least in part axially coextensive with said threaded engagement of said lens housing and base portion, said collet structure including a plurality of axially extending radially yieldable fingers carried by said base portion, and each of said plurality of fingers inwardly defining a part of said threaded engagement between said lens housing and base portion, each of said plurality of fingers outwardly defining a wedged surface extending axially and increasing in diameter toward said body portion; said threaded engagement of said lens housing and base portion also including said lens housing outwardly defining a thread portion threadably engaging with said plurality of fingers;

a locking collar threadably engaging with said lens housing at said thread portion thereof and having a radially inwardly disposed conical surface engaging with said wedged surfaces of said plurality of fingers; said locking collar outwardly defining a thread section of a second hand opposite to said selected first hand;

a locking ring threadably engaging with said locking collar at said thread section of said second hand;

whereby, tightening of said locking collar on said thread portion of said lens housing radially deflects said plurality of fingers to lock said threaded engagement and rotationally and axially immobilize said lens housing relatively to said base portion and body portion carrying said image intensifier tube, and tightening of said locking ring on said locking collar simultaneously tightens said locking collar relative to said base portion while tightening said locking ring relative to said locking collar.

11. The night vision weapon sight of claim 10 wherein said base member carries a retaining ring member captively retaining said locking ring rotationally thereon between said collar member and said body portion.

12. The night vision weapon sight of claim 11 wherein each of said locking collar and said locking ring also includes respective means for engagement by a respective torquing tool, such that a level of torque exceeding manually applicable torque may be applied to said locking collar and locking ring in opposite-handed directions.

* * * * *